United States Patent [19]

Bronco et al.

[11] Patent Number: 5,670,440

[45] Date of Patent: Sep. 23, 1997

[54] PREPARATION OF POLYMERS OF CARBON MONOXIDE AND AN ALIPHATIC ALPHA-OLEFIN

[75] Inventors: Simona Bronco, Zurich; Giambattista Consiglio, Schwerzenbach; Silvia Di Benedetto, Zurich, all of Switzerland; Eit Drent, Amsterdam, Netherlands; Hero Jan Heeres, Amsterdam, Netherlands; Johannes Adrianus Maria Van Broekhoven, Amsterdam, Netherlands; Marinus Johannes Reynhout, Amsterdam, Netherlands

[73] Assignee: Shell Oil Company, Houston, Tex.

[21] Appl. No.: 731,906

[22] Filed: Oct. 22, 1996

Related U.S. Application Data

[62] Division of Ser. No. 457,965, May 31, 1995, Pat. No. 5,608,001.
[51] Int. Cl.$^6$ .......................................... B01J 31/00
[52] U.S. Cl. .......................... 502/162; 528/392; 502/162; 546/348; 568/8
[58] Field of Search .................... 528/392; 502/162; 546/348; 568/8

[56] References Cited

U.S. PATENT DOCUMENTS 5,175,244  12/1992  Budzelaar et al. .................. 528/392

Primary Examiner—Samuel A. Acquah

[57] ABSTRACT

A catalyst composition comprising
  a) a palladium compound,
  b) an anion, and
  c) an asymmetric phosphorus bidentate ligand of the general formula $R^5R^6P\text{-}Q\text{-}CHR^9\text{-}PR+7R^8$, wherein Q is a 1,2-ferrocenyl bridging group, $R^5$, $R^6$, $R^7$ and $R^8$ are identical or different optionally polar substituted hydrocarbyl groups and $R^9$ is hydrogen or an optionally polar substituted hydrocarbyl group;

a process for the preparation of linear alternating copolymers of carbon monoxide with an aliphatic -olefin having at least 3 and at most 10 carbon atoms, which process comprises contacting a mixture of the monomers with a said catalyst composition; and a linear alternating copolymer of carbon monoxide with an aliphatic -olefin having at least 3 and at most 10 carbon atoms which copolymer has an isotacticity of 95% or more.

8 Claims, No Drawings

PREPARATION OF POLYMERS OF CARBON MONOXIDE AND AN ALIPHATIC ALPHA-OLEFIN

This is a division of application Ser. No. 08/457,965, filed May 31, 1995, now U.S. Pat. No. 5,608,001.

FIELD OF THE INVENTION

This invention relates to a catalyst composition for the preparation of linear alternating copolymers of carbon monoxide and an aliphatic-olefin having at least three carbon atoms. The invention further relates to said, preparation and to the resulting copolymers.

BACKGROUND OF THE INVENTION

In the copolymers produced according to this invention the units originating in carbon monoxide and the units originating in the olefinically unsaturated compound(s) used in the preparation occur substantially in an alternating order. Furthermore, the copolymers are regioregular and stereoregular, in particular isotactic.

The term "regioregular" used herein refers to the way in which the units originating in a monomer $CH_2=CH-R$, R being an aliphatic alkyl group, are bound to units originating in carbon monoxide. Three possibilities are distinguishable, which are termed "head/head", "tail/tail" and "head/tail". They may be represented schematically as follows:

head/head: —$(CH_2)$—$(CHR)$—$(CO)$—$(CHR)$—$(CH_2)$—
tail/tail: —$(CHR)$—$(CH_2)$—$(CO)$—$(CH_2)$—$(CHR)$—
head/tail: —$(CH_2)$—$(CHR)$—$(CO)$—$(CH_2)$—$(CHR)$—

Regioregular copolymer are understood to be copolymers in which the units originating in the monomer $CH_2=CH-R$ are bound to the units originating in carbon monoxide predominantly in a head/tail fashion. The degree of regioregularity of such a copolymer is expressed as the average regioregularity, which may be defined as the percentage of the number of units originating in the monomer $CH_2=CH-R$ which are bound to the units originating in carbon monoxide in a head/tail fashion.

The term "stereoregular" used herein refers to the configuration of the chiral carbon atoms present in the regioregular copolymer chains relative to the configuration of the chiral carbon atoms together with which they form part of a diad. A diad in this connection is understood to be a segment of the polymer chain which is made up of two chiral carbon atoms which are interconnected through a —$(CH_2)$—$(CO)$— bridge. As regards the relation between the configurations of the two chiral carbon atoms of a diad, two possibilities are distinguishable, which are referred to as "isotactic" and "syndiotactic": when the two chiral carbon atoms in a diad have the same configuration this diad is called an isotactic diad, whereas the diad is called syndiotactic when the configurations are opposed. These options can be schematically represented as isotactic:

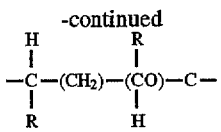

syndiotactic:

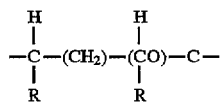

The regioregular copolymers can be divided according to the structure of their chains into three classes:

1) Polymer mixtures in which the number of isotactic diads is substantially equal to the number of syndiotactic diads are referred to as atactic.
2) Polymer mixtures in which the number of isotactic diads is larger than the number of syndiotactic diads are referred to as isotactic.
3) Polymer mixtures in which the number of syndiotactic diads is larger than the number of isotactic diads are referred to as syndiotactic.

The atactic polymer mixtures mentioned under 1) are stereoirregular, whereas the other regioregular polymer mixtures mentioned above possess a degree of stereoregularity. The degree of stereoregularity of the isotactic polymer mixtures is expressed as the average stereoregularity or isotacticity, which is understood to be the percentage of isotactic diads, calculated on the total number of diads present in the polymer chains. On the basis of this definition, the isotactic polymer mixtures have an average stereoregularity of more than 50%.

EP-A-384517 and EP-A-410543 disclose copolymers of carbon monoxide with an aliphatic -olefin having at least three carbon atoms which are made up of linear chains in which the units originating in carbon monoxide alternate with the units originating in the -olefin. These copolymers have a certain degree of regio- and stereoregularity, more specifically they are isotactic in nature. For the sake of simplicity the polymer mixtures may be described as isotactic linear alternating copolymers. EP-A-385517 discloses that the copolymers in question can be prepared by contacting a mixture of the monomers with a catalyst composition comprising a) a palladium compound,
b) an anion of an acid with a pKa of less than 2, and
c) an asymmetric phosphorus bidentate ligand of the general formula $R^1R^2P-R'-PR^3R^3$, wherein R' is a bivalent bridging group containing at least two carbon atoms in the bridge, and $R^1$, $R^2$, $R^3$ and $R^4$ are identical or different optionally polar substituted hydrocarbyl groups, such as the (+)-form and the (−)-form of 4,5-bis(diphenylphosphinomethyl)-2,2-dimethyl-1,3-dioxolane and (−)-4,5-bis(dibutylphosphinomethyl)-2,2-dimethyl-1,3-dioxolane.

In Macromolecules 25, 3604–3606 (1992) it is taught that by using as the asymmetric ligand (6,6'-dimethylbiphenyl-2,2'-diyl)bis(dicyclohexylphosphine) an isotactic linear alternating carbon monoxide/propene copolymer can be prepared which has an isotacticity of about 88%, as calculated from the $^{13}$C-NMR data provided.

EP-A-410543 teaches that when isotactic copolymers are prepared which have a lower degree of isotacticity than required for a certain application, they can be treated to increase their degree of isotacticity, e.g., by extracting the copolymers with a suitable solvent. It is disadvantageous that in this treatment a polymer by product is obtained which in many cases has to be discarded because it does not fulfil the requirements as regards tacticity. It would therefore be desirable to modify the polymerisation such that copolymers with a high degree of isotacticity can be prepared efficiently, i.e. such that the treatment can be avoided and also that the rate of polymerisation is improved.

SUMMARY OF THE INVENTION

It has now surprisingly been found that the polymerisation rate can be improved considerably by using an asymmetric phosphorus bidentate ligand of the general formula $R^5R^6P$-Q-CHR$^9$-PR$^7R^8$, wherein Q is a 1,2-ferrocenyl bridging group, $R^5$, $R^6$, $R^7$ and $R^8$ are identical or different optionally polar substituted hydrocarbyl groups and $R^9$ is hydrogen or an optionally polar substituted hydrocarbyl group. With a specific substitution pattern of the ferrocenyl containing asymmetric ligand, viz. such that $R^5$ and $R^6$ are identical or different optionally polar substituted aromatic hydrocarbyl groups, $R^7$ and $R^8$ are identical or different cycloaliphatic hydrocarbyl groups, and $R^9$ is an aliphatic hydrocarbyl group, a polymerisation rate can be achieved which even exceeds the rate achieved with 1,3-bis(diethylphosphino) propane when used under otherwise comparable conditions. The latter ligand has been indicated to be excellently suitable for obtaining a high polymerisation rate in the copolymerisation of carbon monoxide and an aliphatic -olefin, yielding a linear alternating regioregular atactic polymer, cf. EP-A-516238.

DETAILED DESCRIPTION

The isotacticity of the copolymers which are obtained by using the ferrocenyl containing asymmetric ligand can be higher than achieved previously, even higher than 95%, substantially without loss of the regioregularity, which typically mounts to more than 95%, more typically more than 99%.

The present invention relates to a catalyst composition comprising a) a palladium compound, b) an anion, and c) an asymmetric phosphorus bidentate ligand of the general formula $R^5R^6P$-Q-CHR$^9$-PR$^7R^8$, wherein Q is a 1,2-ferrocenyl bridging group, $R^5$, $R^6$, $R^7$ and $R^8$ are identical or different optionally polar substituted hydrocarbyl groups and $R^9$ is hydrogen or an optionally polar substituted hydrocarbyl group.

The invention further relates to a process for the preparation of copolymers of carbon monoxide with an aliphatic -olefin having at least 3 and at most 10 carbon atoms which copolymers are made up of linear chains in which the units originating in the aliphatic -olefin alternate with units originating in carbon monoxide, which process comprises contacting a mixture of the monomers with a catalyst composition of the invention.

In addition the invention relates to a copolymer of carbon monoxide with an aliphatic -olefin having at least 3 and at most 10 carbon atoms which copolymer is made up of linear chains in which the units originating in the aliphatic -olefin alternate with units originating in carbon monoxide, and which copolymer has an isotacticity of 95% or more.

The catalyst composition of this invention is based on a palladium compound. The catalyst composition may be based on a precursor compound containing palladium in its zero-valent state. Preferably the palladium compound is a palladium salt, such as a salt of a carboxylic acid. Particularly suitable is palladium acetate.

One skilled in the art will realise that the anion used as component b) is weakly or non-coordinating with palladium. It is preferably an ion of an acid having a pKa of less than 6 (determined in an aqueous solution at 18° C.), suitably less than 4 and in particular less than 2. Examples of suitable acids having a pKa of less than 2 are mineral acids, such as perchloric acid, sulphonic acids, such as p-toluenesulphonic acid and trifluoromethanesulphonic acid, and halogen carboxylic acids, such as trifluoroacetic acid. The anion may be incorporated in the catalyst composition in the form of an acid or in the form of a salt. Very suitably the anion is incorporated in the form of nickel perchlorate. The quantity of the anion present in the catalyst composition of this invention may vary between wide limits. Suitably the quantity is in the range of from 0.5–50 mol, in particular from 1–25 mol per mol of palladium.

The phosphorus bidentate ligand of the general formula $R^5R^6P$-Q-CHR$^9$-PR$^7R^8$ as defined hereinbefore is asymmetric. Depending of whether $R^9$ is hydrogen or an optionally polar substituted hydrocarbyl group the ligand's structure provides for at least one or at least two elements of chirality. The ligand may be present as an optically inactive mixture of possible stereoisomers or diastereoisomers, or it may be present as an optically active mixture in which there is an excess of a stereoisomer or diastereoisomer, or the ligand consists of one substantially pure stereoisomer or diastereoisomer. The skilled reader will appreciate that it will have no bearing on the isotacticity of the copolymer whether the ligand used consists of one stereoisomer or diastereoisomer or it consists of said stereoisomer or diastereoisomer and its optical antipode.

The group Q of the bidentate ligand is a bivalent 1,2-ferrocenyl group which may contain further substituents attached to the pentadienyl groups, i.e. other than the $R^5R^6P$- and $R^7R^8P$-CHR$^9$ groups in a 1,2-position, but this is not preferred.

The hydrocarbyl groups $R^5$ and $R^6$ are preferably optionally polar substituted aromatic hydrocarbyl groups which typically have 6 to 12 carbon atoms. When they are polar substituted, eligible substituents are for example dialkylamino groups, whereas preferred polar substituents are alkoxy groups, such as methoxy groups. Polar substituents are typically positioned ortho with respect to the phosphorus atom. The groups $R^5$ and $R^6$ are preferably identical. They are in particular phenyl groups.

The hydrocarbyl groups $R^7$ and $R^8$ are preferably aliphatic groups or more preferably cycloaliphatic groups, such groups typically containing no more than 10 carbon atoms. Optionally they may be connected to one another through a carbon-carbon bond, so that together with the phosphorus atom to which they are attached they form a heterocyclic phosphorus containing group. The groups $R^7$ and $R^8$ are preferably identical. They may in particular be selected for example from an ethyl, 1-propyl, 2-propyl, 1-butyl or 2-butyl group, more in particular they are cyclohexyl groups.

The group $R^9$ is hydrogen or an optionally polar substituted hydrocarbyl group, typically having no more than 10 carbon atoms. The group $R^9$ is preferably other than hydrogen since this may further increase the isotacticity of the polymer obtained. The group $R^9$ is in particular an alkyl group, more in particular a n-alkyl group, such as an ethyl, 1-propyl or 1-butyl group, most in particular a methyl group.

Very good results can be achieved when as the phosphorus bidentate ligand one of the following is used:

{(R)-1-[(S)-2-(diphenylphosphino)ferrocenyl]}ethyldiphenylphosphine,

{(R)-1-[(S)-2-(dicyclohexylphosphino)ferrocenyl]}ethyldiphenylphosphine,

{(R)-1-[(S)-2-(dicyclohexylphosphino)ferrocenyl]}ethyldicyclohexylphosphine,

[2-(diphenylphosphino)ferrocenyl]
   methyldicyclohexylphosphine or
{1-[2-(diphenylphosphino)ferro-
   cenyl]}ethyldiethylphosphine.

Even further improved results can be obtained by using {(R)-1-[(S)-2-(diphenylphosphino)ferrocenyl]}ethyldicyclohexylphosphine as the phosphorus bidentate ligand.

The quantity of the phosphorus bidentate ligand present in the catalyst composition of this invention may vary between wide limits. Suitably the quantity is in the range of from 0.5–2 mol, in particular from 0.75–1.5 mol per mol of palladium.

In order to further increase the rate of polymerisation it is preferred to include in the catalyst composition a quinone, in particular a 1,4-quinone, such as a 1,4-benzoquinone and a 1,4-naphthoquinone. The quantity of quinone suitably lies in the range of from 1–5000 mol, in particular from 5–1000 mol per mol of palladium.

The aliphatic -olefin used as one of the monomers of the process may be branched or a straight chain olefin. The aliphatic -olefin may contain hetero atoms, such as oxygen and nitrogen, which are present when the aliphatic -olefin is e.g. an olefinically unsaturated ester, alcohol or amide. The aliphatic -olefin may also contain an aromatic substituent in such a manner that there is no conjugation of the aromatic substituent with the olefinic double bond, such as in 4-phenyl-1-butene. The aliphatic -olefin is typically a hydrocarbon. The aliphatic -olefin may be a single olefin but also a mixture of -olefins may be used, or, if desired, a mixture of an -olefin with ethene. In the latter case the units in the polymer chains originating in ethene do not contribute to the regio- and stereoregularity of the polymer. In such a case the regularity of the polymer is exclusively related to the parts of the polymer chains which contain units originating in the -olefin.

As the polymer product of this invention can be used in an engineering application or as a packaging material, it is eligible to use a lower olefin as the aliphatic -olefin, i.e. an olefin containing no more than 6 carbon atoms, as a single olefin or as a mixture containing aliphatic -olefins, if desired in conjunction with ethene. Very good results have been achieved with propene, 1-butene and 4-methyl-1-pentene as the aliphatic -olefin.

The preparation of the polymers is preferably carried out by contacting the monomers with a solution of the catalyst composition of this invention in a diluent in which the polymers are insoluble or virtually insoluble. Lower aliphatic alcohols and in particular methanol are suitable as diluents. Very suitable diluents contain for at least 80% v an aprotic liquid and for at most 20% v a protic liquid such as a lower aliphatic alcohol. The aprotic liquid may be a polar liquid, such as acetone, methyl acetate, tetrahydrofuran, dioxane, diethyleneglycol dimethyl ether, gamma-butyrolactone, N-methylpyrrolidone or sulpholane, or an apolar liquid, such as n-hexane, cyclohexane or toluene. Favourable results can be obtained by using a mixture of tetrahydrofuran and methanol. If desired, the polymerisation can also be carded out in the gas phase. The polymer preparation can take place batchwise or continuously.

When the polymerisation is carried out in a diluent which contains a lower aliphatic alcohol the rate of polymerisation may be increased by adding to the polymerisation mixture an ortho ester, such as a trialkyl orthoformate, in particular trimethyl orthoformate. The quantity of the ortho ester may vary between wide limits. Preferably it is used in a quantity of between 100 and 5000 mol, in particular 500 and 3000 mol per mol of palladium.

The quantity of catalyst composition used in the preparation of the polymers may vary within wide limits. Per mol of olefinically unsaturated compound to be polymerised a quantity of catalyst composition is preferably used which contains $10^{-7}$ to $10^{-3}$ and in particular $10^{-6}$ to $10^{-4}$ mol of palladium.

The preparation of the polymers is preferably carried out at a temperature of 20°–150° C. and a pressure of 2–150 bar and in particular at a temperature of 30°–130° C. and a pressure of 5–100 bar. Suitably a temperature below 80° C., in particular below 60° C. is selected as this leads to a higher isotacticity of the copolymer. The molar ratio of the olefinically unsaturated compounds relative to carbon monoxide is preferably 10:1 to 1:10 and in particular 5:1 to 1:5. The polymerisation may be carded out in the presence of hydrogen, in which case the hydrogen is suitably present in a quantity of from 0.1–0.5 mol per mol of carbon monoxide.

The copolymers according to this invention may be recovered from the polymerisation mixture by any suitable method. Such methods are well known in the art.

The invention will now be illustrated with reference to the following examples. The regio- and stereoregularity of the copolymers prepared according to Examples 1–10 was derived from $^{13}C$-NMR spectra (deuterohexafluoroisopropanol solvent), by analysing the signals in the carbonyl region.

EXAMPLE 1

A carbon monoxide/propene copolymer was prepared as follows. A stirred autoclave was charged with 150 ml tetrahydrofuran, 39 g (65 ml) propene and a catalyst solution consisting of 1.5 ml tetrahydrofuran, 8.5 ml methanol 0.06 mmol palladium acetate, 0.3 mmol nickel perchlorate, 0.07 mmol {(R)-1-[(S)-2-(diphenylphosphino)ferrocenyl]}ethyldicyclohexylphosphine, and 3.0 mmol 1,4-naphthoquinone.

Air present in the autoclave was replaced by carbon monoxide, which was forced in to achieve a pressure of 80 bar. The contents of the autoclave were brought to a temperature of 42° C. After 41 hours the polymerisation was terminated by cooling to room temperature and releasing the pressure. The suspension obtained was diluted with methanol. The solids were collected by filtration, washed with methanol and dried.

The yield of copolymer was 47 g. The polymerisation rate calculated from the copolymer yield was 180 g copolymer/(g palladium.hour). The isotacticity of the copolymer obtained was more than 95%. The product showed an optical rotation $\Pi^{p5}$ of 28.4, as measured in hexafluoroisopropanol at a concentration in the range of 5–10 g/100 ml. The optical rotation is a molar value calculated on the basis of the molecular weight of the copolymer's repeating unit (i.e. 70).

EXAMPLE 2

A carbon monoxide/propene copolymer was prepared in substantially the same way as in Example 1, but with the following differences:

a) 0.07 mmol of {(R)-1-[(S)-2-(dicyclohexylphosphino)ferrocenyl]}ethyldiphenylphosphine was used instead of {(R)-1-[(S)-2-(diphenylphosphino)ferrocenyl]}ethyldicyclohexylphosphine, and b) the reaction time was 114 hours instead of 41 hours.

The yield of copolymer was 20.3 g. The polymerisation rate was 28 g copolymer/(g palladium.hour). The isotacticity of the copolymer obtained was 88%.

EXAMPLE 3

A carbon monoxide/propene copolymer was prepared in substantially the same way as in Example 1, but with the following differences:

a) 0.07 mmol of {(R)-1-[(S)-2-(dicyclohexylphosphino) ferrocenyl]}ethyldicyclohexylphosphine was used instead of {(R)-1-[(S)-2-(diphenylphosphino) ferrocenyl]}ethyldicyclohexylphosphine, and b) the reaction time was 138 hours instead of 41 hours.

The yield of copolymer was 30.8 g. The polymerisation rate was 35 g copolymer/(g palladium.hour). The isotacticity of the copolymer obtained was 90%.

EXAMPLE 4

A carbon monoxide/propene copolymer was prepared in substantially the same way as in Example 1, but with the following differences:

a) 0.07 mmol of {(R)-1-[(S)-2-(diphenylphosphino) ferrocenyl]}ethyldiphenylphosphine was used instead of {(R)-1-[(S)-2-(diphenylphosphino)ferrocenyl]}-ethyldicyclohexylphosphine and b) the reaction time was 116 hours instead of 41 hours.

The yield of copolymer was 27.8 g. The polymerisation rate was 38 g copolymer/(g palladium.hour). The isotacticity of the copolymer obtained was 82%.

EXAMPLE 5

(for comparison, not according to the invention)

A carbon monoxide/propene copolymer was prepared in substantially the same way as in Example 1, but with the following differences:

a) 110 ml instead of 150 ml tetrahydrofuran and 87 ml instead of 65 ml propene were used, b) the catalyst solution consisted of
3.9 ml tetrahydrofuran,
1.4 ml methanol
0.091 mmol palladium acetate,
0.65 mmol nickel perchlorate,
0.105 mmol (−)-4,5-bis(dibutylphosphinomethyl)-2,2-dimethyl-1,3-dioxolane and 6.3 mmol 1,4-naphthoquinone, c) the pressure of carbon monoxide was 45 bar instead of 80 bar, d) the reaction time was 65.1 hours instead of 41 hours, and e) the reaction mixture was diluted with water instead of methanol.

The yield of copolymer was 6.83 g. The polymerisation rate was 10.8 g copolymer/(g palladium.hour). The product showed an optical rotation $\Pi^D5$ of +10.4, as measured in hexafluoroisopropanol.

EXAMPLE 6

A carbon monoxide/propene copolymer was prepared as follows. A stirred autoclave was charged with 75 ml tetrahydrofuran, 20 ml propene, 1 ml trimethyl orthoformate and a catalyst solution consisting of
4.0 ml methanol 0.06 mmol palladium acetate,
0.3 mmol nickel perchlorate,
0.07 mmol {(R)-1-[(S)-2-(diphenylphosphino)ferrocenyl]}ethyldicyclohexylphosphine, and
3.0 mmol 1,4-naphthoquinone.

Air present in the autoclave was replaced by carbon monoxide, which was forced in to achieve a pressure of 80 bar. The contents of the autoclave were brought to a temperature of 46° C. The pressure was kept constant by supplying carbon monoxide. From the rate of consumption of carbon monoxide it was calculated that the average polymerisation rate during the first hour of the polymerisation amounted to 490 g copolymer/(g palladium.hour). After 10 hours the polymerisation was terminated by cooling to room temperature and releasing the pressure. The suspension obtained was diluted with methanol. The solids were collected by filtration, washed with methanol and dried.

The yield of copolymer was 16 g. The isotacticity of the copolymer obtained was more than 95%. It had a melting point of 185° C.

EXAMPLE 7

A carbon monoxide/propene copolymer was prepared in substantially the same way as in Example 6, but with the following differences:

a) 0.07 mmol of racemic {1-[2-(diphenylphosphino) ferrocenyl]}ethyldiethylphosphine was used instead of {(R)-1-[(S)-2-(diphenylphosphino)ferrocenyl]}ethyldicyclohexylphosphine, and b) the polymerisation temperature was 49° C. instead of 46° C.

The average polymerisation rate during the first hour of the polymerisation amounted to 195 g copolymer/(g palladium.hour). The yield of copolymer was 10 g. The isotacticity of the copolymer obtained was estimated at about 70%.

EXAMPLE 8

A carbon monoxide/propene copolymer was prepared in substantially the same way as in Example 6, but with the following differences:

a) 0.07 mmol of racemic [2-(diphenylphosphino) ferrocenyl]methyldicyclohexylphosphine was used instead of {(R)-1[(S)-2-(diphenylphosphino) ferrocenyl]}ethyldicyclohexylphosphine, and b) the polymerisation temperature was 49° C. instead of 46° C.

The average polymerisation rate during the first hour of the polymerisation amounted to 270 g copolymer/(g palladium.hour). The yield of copolymer was 12 g. The isotacticity of the copolymer obtained was estimated at about 80%.

EXAMPLE 9

(for comparison, not according to the invention)

A carbon monoxide/propene copolymer was prepared in substantially the same way as in Example 6, but with the difference that 0.07 mmol of 1,3-bis(diethylphosphino) propane was used instead of {(R)-1-[(S)-2-(diphenylphosphino)ferro-cenyl]}ethyldicyclohexylphosphine.

The average polymerisation rate during the first hour of the polymerisation amounted to 220 g copolymer/(g palladium.hour). The yield of copolymer was 11 g. The copolymer obtained was regioregular and atactic. It had a melting point of 131° C.

EXAMPLE 10

A carbon monoxide/4-methyl-1-pentene copolymer was prepared as follows. A stirred autoclave was charged with 8.4 g 4-methyl-1-pentene and a catalyst solution consisting of 14 ml t-butanol, 1.3 ml methanol, 2.1 ml toluene, 0.1 mmol palladium acetate, 0.3 mmol nickel perchlorate, 0.11 mmol {(R)-1-[(S)-2-(diphenylphosphino)ferrocenyl]}ethyl-dicyclohexylphosphine, and 1.5 mmol 1,4-naphthoquinone.

Air present in the autoclave was replaced by carbon monoxide, which was forced in to achieve a pressure of 40 bar. The contents of the autoclave were brought to a temperature of 40° C. After 168 hours the polymerisation was terminated by cooling to room temperature and releasing the pressure. The mixture obtained was stirred in methanol. The solids were collected by filtration, washed with methanol and dried.

The yield of copolymer was 10 g. The isotacticity of the copolymer obtained was more than 95%.

EXAMPLE 11

A carbon monoxide/1-butene copolymer was prepared using the procedure of Example 10, but with the following differences:

a) 10 g 1-butene was used instead of 4-methyl-1-pentene, b) carbon monoxide was forced in to achieve a pressure of 43 bar instead of 40 bar, and c) the time of polymerisation was 21 hours instead of 168 hours.

The yield of copolymer was 9.1 g. The isotacticity of the copolymer obtained was more than 95%.

The $^{13}$C-NMR analyses further revealed that the copolymers prepared in the Examples 1–11 had a linear alternating structure.

By comparing the results of Examples 1–5 it becomes apparent that by using a ferrocenyl containing bidentate ligand according to this invention a polymerisation rate can be achieved which exceeds by far the polymerisation rate achieved in the known polymerisation using (−)-4,5-bis (dibutylphosphinomethyl)-2,2-dimethyl-1,3-dioxolane as the ligand. Particularly good results are obtained by selecting a ferrocenyl containing ligand of the general formula $R^5R^6P-Q-CHR^9-PR^7R^8$, wherein Q is a 1,2-ferrocenyl bridging group, $R^5$ and $R^6$ are aromatic hydrocarbyl groups, $R^7$ and $R^8$ are cycloaliphatic hydrocarbyl groups, and $R^9$ is an aliphatic hydrocarbyl group. Copolymers obtained when using a ligand of the latter class can have an isotacticity of more than 95% (cf. also Examples 10 and 11). The optical rotations measured in Examples 1 and 5 are indicative for a substantially higher isotacticity of the copolymer obtained in the former Example.

The results of Examples 6–9 confirm the results obtained in the Examples 1–5 and show that by using a ferrocenyl containing bidentate ligand according to this invention a polymerisation rate can be achieved which exceeds the rate achievable with 1,3-bis(diethylphosphino)propane, which is a ligand according to the prior art which has been indicated to be very suitable for obtaining a high polymerisation rate in the copolymerisation of carbon monoxide with an aliphatic -olefin.

Comparison of Examples 6 and 8 shows that a higher isotacticity of the copolymer product can be obtained by introducing into the ferrocenyl containing bidentate ligand a chiral centre as the second element of chirality.

We claim as our invention:

1. A catalyst composition comprising
    a) a palladium compound,
    b) an anion, and
    c) an asymmetric phosphorus bidentate ligand of the general formula $R^5R^6P-Q-CHR^9-PR^7R^8$, wherein Q is a 1,2-ferrocenyl bridging group, $R^5$, $R^6$, $R^7$ and $R^8$ are identical or different optionally polar substituted hydrocarbyl groups and $R^9$ is hydrogen or an optionally polar substituted hydrocarbyl group.

2. A catalyst composition as claimed in claim 1, characterised in that in the general formula of the phosphorus bidentate ligand $R^5$ and $R^6$ are identical or different optionally polar substituted aromatic hydrocarbyl groups, $R^7$ and $R^8$ are identical or different cycloaliphatic hydrocarbyl groups, and $R^9$ is an aliphatic hydrocarbyl group.

3. A catalyst composition as chimed in claim 2, characterised in that in the general formula of the phosphorus bidentate ligand $R^5$ and $R^6$ are phenyl groups, $R^7$ and $R^8$ are cyclohexyl groups, and $R^9$ is a methyl group.

4. A catalyst composition as claimed in claim 3, characterised in that the phosphorus bidentate ligand is {(R)-1-[(S)-2-(diphenylphosphino)ferrocenyl]}ethyldicyclohexylphosphine.

5. A catalyst composition as claimed in claim 4, characterised in that it comprises as the palladium compound a palladium carboxylate, such as palladium acetate.

6. A catalyst composition as claimed in claim 1, characterised in that it comprises as component b) an anion of an acid having a pKa of less than 2 or a halogen carboxylic acid.

7. A catalyst composition as claimed in claim 1, characterised in that it comprises the phosphorus bidentate ligand in a quantity in the range of from 0.75–1.5 mol per mol of palladium and the anion used as component b) in a quantity in the range of from 1–25 mol per mol of palladium.

8. A catalyst composition as claimed in claim 1, characterised in that it comprises as an additional component a quinone in a quantity in the range of from 5–1000 mol per mol of palladium.

* * * * *